Jan. 20, 1931.           F. J. OVEN            1,789,770
                      SPARK PLUG GASKET
                      Filed Feb. 6, 1929

Inventor
Frank J. Oven
Daniel J. Brennan
Attorney.

Patented Jan. 20, 1931

1,789,770

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

SPARK-PLUG GASKET

Application filed February 6, 1929. Serial No. 337,857.

The invention relates to gaskets and particularly to spark plug gaskets that are made entirely of metal arranged for self-distortion to fit irregular surfaces.

The primary object of the invention is to provide an all metal gasket made up of a plurality of shims slidingly secured within a casing, to improve the resiliency of the gasket and to make it pliable.

Another object of the invention is to provide a novel gasket that is efficient in use and simple and inexpensive of manufacture.

These and other objects in view will become more apparent upon a perusal of the specification and claims with reference to the drawings, in which:

Figure 1:
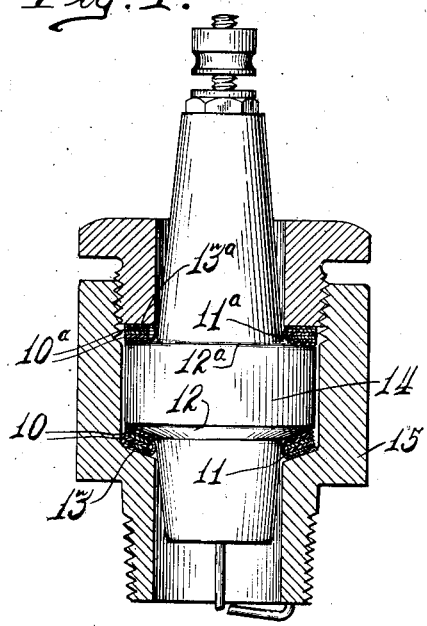
Fig. 1 is an axial sectional view of a spark plug showing gaskets embodying the features of the present invention.
Figure 2:
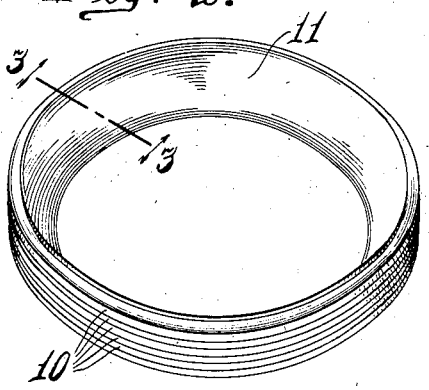
Fig. 2 is a perspective view of the gasket.
Figure 3:
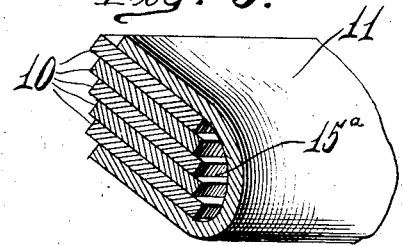
Fig. 3 is a sectional view on an enlarged scale taken on line 3—3 of Fig. 2.

In the form of the invention shown in Figures 1, 2 and 3, the gasket comprises a plurality of shims 10 held together by an annular retaining member 11. Preferably the member 11 is formed from a single piece of metal into an annulus substantially U-shaped in cross-section and opening outwardly. In the present instance, the sides of the annulus extend in the same general direction at an angle to the plane of the gasket so as to constitute the gasket concavo-convex in form, thereby adapting it for use between tapered shoulders, such as the shoulders 12 and 13 of the insulator 14 and shell 15 shown in Fig. 1.

The shims 10 comprise sheets of very thin and soft metal annular in form and held in superposed relation in the member 11. The inner peripheral wall connecting the spaced side walls of the gasket is generally arcuate in cross section, and defines a closed space 15ª at the inner edge surfaces of the shims 10. This space provides clearance permitting sliding of the shims 10 with respect to each other, when the gasket is placed under pressure and distorted to make a tight joint between the shoulders 12 and 13, and also constitutes a cooling chamber. It will be readily understood that a gasket of this construction easily adapts itself to irregularities in the surfaces that it engages, and that when it is subjected to pressure, distortion takes place and the shims 10 slide and adjust themselves to accommodate the distortion.

Figure 4:
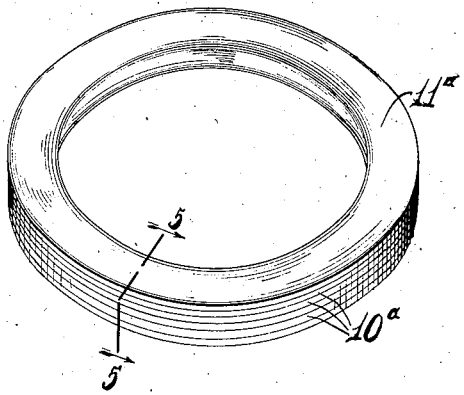
Fig. 4 is a perspective view of a modified form of the invention.
Figure 5:
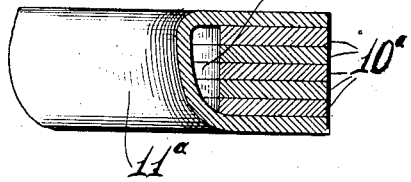
Fig. 5 is a sectional view on an enlarged scale taken on line 5—5 of Fig. 4.

The modified form of gasket, shown in Figures 1, 4 and 5, is in all respects similar to the preferred form, except that the annulus 11a is substantially flat as distinguished from the concavo-convex form shown in Fig. 3, as also are the shims 10a. The gasket is adapted for insertion between shoulders 12a and 13a. (See Fig. 1.)

From the foregoing, it will be evident that a novel gasket is provided which is made entirely of metal, which is adapted for use in spark plugs, which is readily distortable to fit irregularities in the surfaces between which it is interposed and subjected to pressure, and which will conform to these irregularities without injury to any of the parts.

Gaskets heretofore provided for use in spark plugs do not distort to suit the conditions described without injury to the associated parts.

I claim:

1. A gasket comprising an annular section of metal bent back upon itself to form opposed spaced layers providing an outwardly opening channel and having an arcuate portion interconnecting the layers disposed opposite the opening of the channel, and superposed flat shims, the apertures of which are of greater diameter than the diameter of said arcuate portions, arranged between said layers outwardly of said arcuate portion to provide for limited movement of said shims relative to said arcuate portion.

2. A gasket comprising an annular section of metal bent back upon itself to form opposed spaced layers providing an outwardly opening channel and having an arcuated portion interconnecting the layers disposed opposite the opening of the channel, and a plurality of independent superposed flat shims of annular formation disposed between said layers with the inner peripheries thereof spaced from said arcuated portion.

In testimony whereof I affix my signature at 10 South LaSalle Street, Chicago, Illinois.

FRANK J. OVEN.